Patented Sept. 29, 1953

2,653,950

UNITED STATES PATENT OFFICE 2,653,950

1-(HYDROXYALKYLAMINOALKYLAMINO)-4-METHYLTHIAXANTHONES AND PREPARATION THEREOF

Sydney Archer, Albany, N. Y., assignor to Sterling Drug Inc., New York, N. Y., a corporation of Delaware No Drawing. Application November 22, 1950, Serial No. 197,172

21 Claims. (Cl. 260—328)

This invention relates to 1-(hydroxyalkylaminoalkylamino)-4-methylthiaxanthones and to their preparation. In particular it relates to thiaxanthones having the structural formula

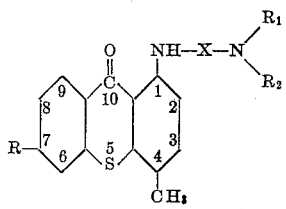

where R is hydrogen, a halo group, a lower alkyl radical or a lower alkoxy radical, X is a lower alkylene radical having its two connecting linkages on adjacent carbon atoms, $R_1$ is hydrogen or a lower alkyl radical and $R_2$ is a lower 2-hydroxyalkyl radical. These compounds of my invention are useful as chemotherapeutic agents, for instance, as agents for treating schistosomiasis.

In the above structural formula R, when halo, means chloro, bromo, iodo and fluoro. R, when lower alkyl, and $R_1$, when lower alkyl, each has preferably from 1–4 carbon atoms inclusive, including such radicals as methyl, ethyl, n-propyl, isopropyl, n-butyl, isobutyl and 2-butyl. R, when lower alkoxyl, has preferably from 1–4 carbon atoms inclusive, including such radicals as methoxy, ethoxy, n-propoxy, isopropoxy, n-butoxy, isobutoxy and 2-butoxy. $R_2$, the lower 2-hydroxyalkyl radical, has preferably from 2–4 carbon atoms inclusive, encompassing radicals having a hydroxy group attached to the carbon atom that is one carbon atom removed from the side chain nitrogen atom, such 2-hydroxyalkyl radicals including 2-hydroxyethyl, 2-hydroxypropyl, 2-hydroxy-2-methylpropyl, 2-hydroxybutyl, and the like. The lower alkylene radical, designated hereinabove as X, has preferably from 2–4 carbon atoms inclusive. X thus comprehends such radicals as —CH₂CH₂—,
    —CH(CH₃)CH₂—, —CH₂CH(CH₃)—,
    —CH(CH₃)CH(CH₃)—
and —CH(C₂H₅)CH₂—.

My compounds are prepared by heating, preferably in refluxing pyridine at atmospheric pressure, a hydroxyalkylaminoalkylamine having the formula, $R_1R_2N$—X—$NH_2$, with a 1-halo-4-methylthiaxanthone having the formula

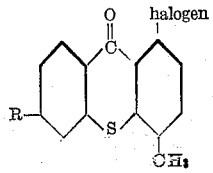

where R, $R_1$, $R_2$ and X have the meanings designated hereinabove and halogen means chloro, bromo, iodo and fluoro. The intermediate 1-halo-4-methyl-7-R-thiaxanthones where R is a halo radical, a lower alkyl radical or a lower alkoxy radical are prepared by cyclizing a 2-(2-methyl-5-halophenylmercapto)-4-R-benzoic acid. These intermediate 2-(2-methyl-5-halophenylmercapto)-4-R-benzoic acids, which are prepared by heating a metal salt of a 2-halo-4-substituted-benzoic acid with a metal salt of a 2-methyl-5-halothiophenyl in the presence of a copper catalyst, are described and claimed in my copending application Serial Number 197,174, filed November 22, 1950.

The intermediate 1-chloro-4-methylthiaxanthone (where R is H) was obtained mixed with its 1-methyl-4-chloro isomer according to Ullmann and Glenck [Ber. 49, 2487 (1916)] by condensing para-chlorotoluene with thiosalicylic acid in sulfuric acid. I also prepared this mixture of isomeric chloro-methyl-thiaxanthones by substituting dithiosalicylic acid for thiosalicylic acid in the condensation with para-chlorotoluene, a specific adaptation of a general procedure first discovered by Davies and Smiles [J. Chem. Soc. 97, 1290 (1909)]. This mixture of isomeric thiaxanthones can be used satisfactorily in the condensation with a hydroxyalkylaminoalkylamine since only the 1-chloro-4-methyl isomer reacts with the diamine.

Illustrative of my invention are the preparations of: 1-[2-(2-hydroxyethylamino)ethylamino]-4-methyl-7-iodothiaxanthone hydrochloride by the reaction of 2-(2-hydroxyethylamino)ethylamine with 1-chloro-4-methyl-7-iodothiaxanthone; 1-[2-(N-n-butyl-N-2-hydroxypropylamino)ethylamino]-4-methyl-7-ethylthiaxanthone hydrobromide from 2-(N-n-butyl-N-2-hydroxypropylamino)ethylamine and 1-bromo-4-methyl-7-ethylthiaxanthone; and 1-[1-(N-ethyl-N-2-hydroxyethylamino)-2-propylamino]-4-methyl-7-isopropoxythiaxanthone hydroiodide from 1-(N-ethyl-N-2-hydroxyethylamino)-2-propylamine and 1-iodo-4-methyl-7-isopropoxythiaxanthone.

My 1-(hydroxyalkylaminoalkylamino)-4-methylthiaxanthones are therapeutically active when administered orally whether employed as the free bases or as their salts with relatively non-toxic organic or inorganic acids, although in most cases the salt form is more convenient to employ. I found it convenient to isolate my compounds as the hydrohalides, especially the hydrochlorides. However, other acid addition salts are within the scope of my invention, such salts including the phosphates, sulfates, citrates, ethanesulfonates, tartrates, succinates, acetates, benzoates, mandelates, oleates, and the like.

Specific embodiments of my invention are further illustrated in the following examples:

EXAMPLE 1

A.  1-chloro-4-methylthiaxanthone

The following preparation yields a mixture of the desired 1-chloro-4-methylthiaxanthone and its isomer, 1-methyl-4-chlorothiaxanthone, said mixture being satisfactory for use in the condensation reactions described below.

A mixture of 150 ml. of p-chlorotoluene and 1500 ml. of sulfuric acid was stirred vigorously at 25-30° C. as 60 g. of pure thiosalicyclic acid was added. The mixture turned dark red, sulfur dioxide was evolved and the temperature rose about ten to fifteen degrees. Stirring was continued for about sixteen hours at room temperature and then the mixture was held at 60° C. for two hours. The solution was poured into an ice-water mixture and filtered. The yellow solid was suspended in dilute ammonia and steam was passed into the suspension for thirty minutes to remove unreacted p-chlorotoluene. Then the solid was collected on a filter and washed successively with water, alcohol and acetone. On drying there was obtained 83 g. (81%) of the thiaxanthone mixture suitable for use in the condensation with the diamine. It melted at 142-145° C. (uncor.). Upon crystallization from acetic acid the melting point was raised slightly to 145-147° C. The loss on crystallization was about 20%.

In another experiment 159 g. of crude dithiosalicylic acid was condensed with 750 ml. of p-chlorotoluene in the presence of 1250 ml. of sulfuric acid. The temperature rise upon the addition of the dithio acid was about five degrees. At the end of the reaction the mixture was poured into ice water and the suspension steam-distilled to remove excess p-chlorotoluene. The solid was collected and treated as above. There was obtained 175 g. (65%) of the mixture of 1-chloro-4-methylthiaxanthone and 1-methyl-4-chlorothiaxanthone, M. P. 138-142° C.

B.  1-[2-(2-hydroxy-2-methylpropylamino)ethylamino]-4-methylthiaxanthone hydrochloride Thirty grams of a mixture of 1-chloro-4-methylthiaxanthone and its 1-methyl-4-chloro isomer, 20 g. of 2-(2-hydroxy-2-methylpropylamino)ethylamine and 15 g. of pyridine were refluxed for eighteen hours at atmospheric pressure. The mixture was treated with a few ml. of 50% aqueous potassium hydroxide solution and steam-distilled. The residue was cooled and filtered. It was boiled with 250 ml. of acetone and filtered. The acetone extraction was repeated. The acetone filtrates were concentrated to dryness, the residue was taken up in ether and the ether solution was filtered. The filtrate was treated with ethanolic hydrogen chloride, whereupon the solid that separated was removed and crystallized twice from absolute ethanol. There was thus obtained 8.5 g. of 1-[2-(2-hydroxy-2-methylpropylamino)-ethylamino]-4-methylthiaxanthone as the hydrochloride, M. P. 227.7-228.5° C. (cor.).

Anal.: Calcd. for $C_{20}H_{24}N_2O_2S \cdot HCl$: N, 7.13; S, 8.16. Found: N, 6.77; S, 8.25.

EXAMPLE 2

1-[2-(2-hydroxypropylamino)ethylamino]-4-methylthiaxanthone hydrochloride

A mixture of 30 g. of 1-chloro-4-methylthiaxanthone and its isomer, 1-methyl-4-chlorothiaxanthone (as prepared above in Example 1A), 15 g. of 2-(2-hydroxypropylamino)ethylamine and 15 g. of dry pyridine was heated under reflux for sixteen hours. The solution was cooled, treated with a few ml. of 50% aqueous potassium hydroxide solution and steam-distilled. The residue was cooled, filtered and then dissolved in a minimum quantity of boiling glacial acetic acid. The acidic solution was diluted with six volumes of water and the resulting suspension was heated to boiling and filtered. The insoluble material was washed with water, pressed dry and discarded. The filtrate was made basic, whereupon there separated an oil which was taken up in chloroform. The chloroform solution was dried and concentrated under reduced pressure, yielding a residue which was dissolved in dry ether. The ether solution was filtered and the filtrate treated with a slight excess of ethanolic hydrogen chloride. There was thus obtained 12.0 g. of 1-[2-(2-hydroxypropylamino)ethylamino]-4-methylthiaxanthone as the hydrochloride, which melted at 204-206° C. (cor.) when recrystallized from 95% ethanol and dried at 75° C. for twenty-four hours.

Anal.: Calcd. for $C_{19}H_{22}N_2O_2S \cdot HCl$: N, 7.39; S, 8.46. Found: N, 7.16; S, 8.53.

EXAMPLE 3

1-[2-(2-hydroxyethylamino)ethylamino]-4-methylthiaxanthone hydrochloride

This preparation was carried out following the directions given in Example 2 but using 30 g. of a mixture of 1-chloro-4-methylthiaxanthone and its 1-methyl-4-chloro isomer, 20 g. of 2-(2-hydroxyethylamino)ethylamine and 30 g. of dry pyridine, with a reflux period of eighteen hours. There was thus obtained 11.1 g. of the desired product, 1-[2-(2-hydroxyethylamino)ethylamino]-4-methylthiaxanthone in the form of its hydrochloride, which melted at 266.2-269° C. (cor.) when recrystallized from ethanol-water.

Anal.: Calcd. for $C_{18}H_{20}N_2O_2S \cdot HCl$: S, 8.79. Found: S, 8.57.

EXAMPLE 4

A.  2-(2-hydroxybutylamino)ethylamine

The general procedure of Kitchen and Pollard [J. Org. Chem. 8, 342 (1943)] was followed. Twenty-seven grams of 1,2-epoxybutane was added dropwise with stirring to 135 g. of ethylenediamine which was heated to 60° C. After all the oxide had been added the mixture was heated to 75° C., held there three hours and then distilled. There was recovered 108 g. of ethylenediamine. The product, 2-(2-hydroxybutylamino)-ethylamine, boiled at 102° C. (3 mm.) and weighed 36.3 g.

Anal.: Calcd. for $C_6H_{16}N_2O$: N, 21.20. Found: N, 20.70.

B.  1-[2-(2-hydroxybutylamino)ethylamino]-4-methylthiaxanthone hydrochloride This preparation was carried out following the directions given hereinabove in Example 2 but using 20 g. of a mixture of 1-chloro-4-methylthiaxanthone and its 1-methyl-4-chloro isomer, 9 g. of 2-(2-hydroxybutylamino)ethylamine and 10 g. of dry pyridine. The resulting product, 1-[2-(2-hydroxybutylamino)ethylamino]-4-methylthiaxanthone hydrochloride, melted at 206-207.7° C. (cor.) when recrystallized from ethanol-ether.

Anal.: Calcd. for $C_{20}H_{24}N_2O_2S \cdot HCl$: N, 7.13; S, 8.16. Found: N, 6.76; S, 8.12.

EXAMPLE 5

A. *N-n-butyl-N-2-hydroxypropylamine*

A solution of 145 g. of n-butylamine and 400 ml. of methanol was heated to reflux. The source of heat was removed and 112 g. of proylene oxide was added at such a rate that gentle reflux was maintained. After all of the oxide had been added, the solution was heated for an additional hour and then distilled, first at atmospheric pressure to remove the solvent and then at 20 mm. The fraction, boiling at 98–100° C. and weighing 134 g. (52%), was the desired product, N-n-butyl-N-2-hydroxypropylamine.

Anal.: Calcd. for $C_7H_{17}NO$: N, 10.67. Found: N, 10.62.

There was also obtained 75 g. of a higher boiling oil which presumably was the tertiary-amine, N,N-di-n-butyl-N-2-hydroxypropylamine.

B. *2-(N-n-butyl-N-2-hydroxypropylamino)-ethylamine*

A mixture of 102 g. of 2-bromoethylphthalamide, 109 g. of N-n-butyl-N-2-hydroxypropylamine and 240 ml. of dry xylene was refluxed for ten hours. The mixture was cooled and filtered. The filtrate was concentrated to remove xylene and the residue dissolved in 400 ml. of ethanol. The solution was heated to boiling with stirring and treated with 32 g. of 85% hydrazine hydrate. After three hours the mixture was concentrated to dryness. The complex was dissolved in water and made acid with hydrochloric acid. The phthalhydrazide was filtered, pressed dry and washed with a liberal quantity of water. The combined filtrates were taken to dryness. The residue of diamine hydrochloride was dissolved in a minimum quantity of water and then treated with solid potassium hydroxide until the oil layer which separated did not increase in size. The oil layer was separated and the aqueous phase extracted with ether. The combined organic layers were dried over potassium hydroxide and distilled. The product, 2-(N-n-butyl-N-2-hydroxypropylamino)-ethylamine, boiled at 109–111° C. (3 mm.) and weighed 35 g. (53%).

Anal.: Calcd. for $C_9H_{22}N_2O$: N, 16.07. Found: 15.93.

C. *1-[2-(N-n-butyl-N-2-hydroxypropylamino)-ethylamino]-4-methylthiaxanthone hydrochloride*

A mixture of 15 g. of 1-chloro-4-methylthiaxanthone and its 1-methyl-4-chloro isomer, 7 g. of 2-(N-n-butyl-N-2-hydroxypropylamino) ethylamine and 8 g. of dry pyridine was heated under reflux for eighteen hours. The solution was cooled, treated with a few ml. of 50% aqueous potassium hydroxide solution and steam-distilled. The residue was cooled, filtered and dissolved in a minimum quantity of boiling glacial acetic acid and the resulting acidic solution was diluted with six volumes of water. The resulting suspension was heated to boiling and filtered. The insoluble material was washed with water, pressed dry and discarded. The filtrate was made basic whereupon there separated an oil which was taken up in chloroform. The chloroform solution was dried and concentrated under reduced pressure yielding a residue which was dissolved in dry ether. The ether solution was filtered and the filtrate was treated with a slight excess of ethanolic hydrogen chloride, whereupon there was obtained the product, 1-[2-(N-n-butyl-N-2-hydroxypropylamino) ethylamino]-4-methylthiaxanthone hydrochloride, which melted at 158.7–162.0° C. (cor.) when recrystallized from ethanol-acetone.

Anal.: Calcd. for $C_{23}H_{30}N_2O_2S \cdot HCl$: N, 6.44; S, 7.37. Found: N, 6.40; S, 7.32.

EXAMPLE 6

A. *2-(N-methyl-N-2-hydroxypropylamino) ethylamine*

This preparation was carried out following the procedure given in Example 5B but using 204 g. of 2-bromoethylphthalimide, 148 g. of N-methyl-N-(2-hydroxypropyl) amine and 500 ml. of dry xylene with a reflux period of seven hours. The product, 2-(N-methyl-N-2-hydroxypropylamino)ethylamine, boiled at 81–83° C. (2.0 mm.) and weighed 60.0 g.

Anal.: Calcd. for $C_6H_{16}N_2O$: N, 21.20. Found: N, 20.50.

B. *1-[2-(N-methyl-N-2-hydroxypropylamino)-ethylamino]-4-methylthiaxanthone hydrochloride*

This preparation was carried out according to the procedure described hereinabove in Example 5C but using 20 g. of a mixture of 1-chloro-4-methylthiaxanthone and its 1-methyl-4-chloro isomer, 10 g. of 2-(N-methyl-N-2-hydroxypropylamino)ethylamine and 10 g. of dry pyridine. The product, 1-[2-(N-methyl-N-2-hydroxypropylamino)ethylamino]-4-methylthiaxanthone hydrochloride, melted at 144.4–146.1° C. (cor.) when recrystallized from ethanol-ether.

Anal.: Calcd. for $C_{20}H_{24}N_2O_2S \cdot HCl$: N, 7.13; S, 8.16. Found: N, 6.92; S, 7.88.

EXAMPLE 7

A. *N-ethyl-N-2-hydroxyethylaminoacetone*

This preparation was carried out using a modification of the method of Breslow et al. [JACS 68, 100 (1946)]. A solution of 125 g. of N-ethyl-N-2-hydroxyethylamine and 75 ml. of ether was heated dropwise to a warmed solution of 63 g. of chloroacetone and 75 ml. of ether. The addition required one hour. The mixture was then refluxed for three hours more, after which time the N-ethyl-N-2-hydroxyethylamine hydrochloride had separated as an oily layer. After the amine salt layer had been removed, the ether layer was distilled, yielding the product, N-ethyl-N-2-hydroxyethylaminoacetone, which distilled at 48–49° C. at 1 mm. and weighed 56 g. (54%).

Anal.: Calcd. for $C_7H_{15}NO_2$: N, 9.60. Found: N, 10.06.

B. *1-(N-ethyl-N-2-hydroxyethylamino)-2-propylamine*

A solution of 94 g. of N-ethyl-N-2-hydroxyethylaminoacetone in 500 ml. of 15% methanolic ammonia was hydrogenated at 70° C. at 450 p.s.i. in the presence of Raney nickel catalyst. Reduction was complete in seven hours. The catalyst was filtered off and the filtrate distilled. After a forerun of 18.4 g., B.P. 64–69° C. (0.4 mm.), there was obtained 56.3 g. (59%) of the pure diamine, 1-(N-ethyl-N-2-hydroxyethylamino)-2-propylamine, B.P. 69–70.5° C. (0.4 mm.).

Anal.: Calcd. for $C_7H_{18}N_2O$: N, 19.27. Found: N, 19.01.

C. *1-[1-(N-ethyl-N-2-hydroxyethylamino)-2-propylamino]-4-methylthiaxanthone hydrochloride*

This method was carried out following the directions given hereinabove in Example 5C but using 20 g. of a mixture of 1-chloro-4-methylthiaxanthone and its 1-methyl-4-chloro isomer, 10 g. of 1-(N-ethyl-N-2-hydroxyethylamino)-2-propylamine and 10 g. of dry pyridine. The product, 1 - [1 - (N - ethyl - N - 2 - hydroxyethylamino) - 2 - propylamino] - 4 - methylthiaxanthone hydrochloride, melted at 152–154° C. (cor.) when recrystallized from ethanol.

Anal.: Calcd. for $C_{21}H_{26}N_2O_2S \cdot HCl$: N, 6.89; S, 7.88. Found: N, 7.27; S, 7.20.

Other 1 - [1 - (N - ethyl - N - 2 - hydroxyethylamino) - 2 - propylamino] - 4 - methylthiaxanthones can be prepared according to the above procedure, using other 1-halo-4-methylthiaxanthones in place of the mixture of 1-chloro-4-methylthiaxanthone and its 1-methyl-4-chloro isomer. Thus, 1-[1-(N-ethyl-N-2-hydroxyethylamino) - 2 - propylamino] - 4 - methyl - 7 - chlorothiaxanthone hydrochloride, 1 - [1 - (N-ethyl - N - 2 - hydroxyethylamino) - 2 - propylamino]-4,7-dimethylthiaxanthone hydrochloride and 1 - [1 - (N - ethyl - N - 2 - hydroxyethylamino) - 2 - propylamino] - 4 - methyl - 7 - methoxythiaxanthone hydrochloride are formed using 1,7 - dichloro - 4 - methylthiaxanthone, 1-chloro-4,7-dimethylthiaxanthone and 1-chloro-4-methyl-7-methoxythiaxanthone, respectively.

EXAMPLE 8

A. 2-(N-n-butyl-N-2-hydroxyethylamino)ethylamine

This preparation was carried out according to the procedure described hereinabove in Example 5B but using 51 g. of 2-bromoethylphthalimide, 47.5 g. of N-n-butyl-N-2-hydroxyethylamine and 120 ml. of dry xylene, with a reflux period of ten hours. The product, 2-(N-n-butyl-N-2-hydroxyethylamino)-ethylamine, boiled at 145–147.5° C. at 21 mm.

Anal.: Calcd. for $C_8H_{20}N_2O$: N, 17.42. Found: N, 17.08.

B. 1 - [2 - (N - n - butyl - N - 2 - hydroxyethylamino)ethylamino] - 4 - methylthiaxanthone hydrochloride This preparation was carried out according to the procedure described hereinabove in Example 5C but using 15 g. of a mixture of 1-chloro-4-methylthiaxanthone and its 1-methyl-4-chloro isomer, 6.5 g. of 2-(N-n-butyl-N-2-hydroxyethylamino)ethylamine and 10 g. of pyridine. The product, 1 - [2 - N - n - butyl - N - 2 - hydroxyethylamino)ethylamino] - 4 - methylthiaxanthone hydrochloride, melted at 135–139° C. (cor.) when recrystallized from ethanol-ether.

Anal.: Calcd. for $C_{22}H_{28}N_2O_2S \cdot HCl$: N, 6.65; S, 7.62. Found: N, 6.40; S, 7.91.

EXAMPLE 9

A. 1,7-dichloro-4-methylthiaxanthone

This preparation was carried out according to the procedure described hereinafter for Example 16A, but using 4.0 g. of 2-(2-methyl-5-chlorophenylmercapto) - 4 - chlorobenzoic acid and 40 g. of sulfuric acid. There was thus obtained 3.5 g. of 1,7-dichloro-4-methylthiaxanthone, M. P. 196–197° C. (cor.) when recrystallized from acetic acid.

Anal.: Calcd. for $C_{14}H_8Cl_2OS$: C, 57.1; H, 2.71. Found: C, 57.5; H, 2.94.

Other 1,7-dihalo-4-methylthiaxanthones can be prepared according to the above procedure by substituting the appropriate 2-(2-methyl-5-halophenylmercapto)-4-halobenzoic acid for 2-(2-methyl-5-chlorophenylmercapto) - 4 - chlorobenzoic acid. Thus, using 2-(2-methyl-5-bromophenylmercapto) - 4 - bromobenzoic acid, 2 - (2-methyl-5-iodophenylmercapto) - 4 - iodobenzoic acid, 2 - (2-methyl-5-chlorophenylmercapto)-4-bromobenzoic acid and 2-(2-methyl-5-chlorophenylmercapto)-4-iodobenzoic acid, there is obtained 1,7-dibromo-4-methylthiaxanthone, 1,7-diiodo - 4 - methylthiaxanthone, 1 - chloro - 4-methyl-7-bromothiaxanthone and 1-chloro-4-methyl-7-iodothiaxanthone, respectively.

B. 2-(N-ethyl-N-2-hydroxyethylamino)ethylamine

This preparation was carried out following the procedure described hereinabove in Example 5B, but using 130 g. of 2-bromoethylphthalimide, 98 g. of N-ethyl-N-2-hydroxyethylamine and 310 ml. of dry xylene. The product, 2-(N-ethyl-N-2-hydroxyethylamino)ethylamine, distilled at 74–75° C. (0.7 mm.) and weighed 30.2 g. (45%).

Anal.: Calcd. for $C_6H_{16}N_2O$: N, 21.20. Found: N, 21.10.

C. 1-[2 - (N - ethyl - N - 2 - hydroxyethylamino)ethylamine]-4-methyl-7 - chlorothiaxanthone hydrochloride A mixture of 29 g. of 1,7-dichloro-4-methylthiaxanthone, 28 g. of 2-(N-ethyl-N-2-hydroxyethylamino)ethylamine and 25 g. of pyridine was refluxed for eighteen hours. The solution was cooled to 80° C. and treated with 100 ml. of absolute ethanol. The solution was boiled and filtered. To the hot filtrate there was added 100 ml. of 25% ethanolic hydrogen chloride. On cooling, the hydrochloride separated. It was filtered, washed with three 20 ml. portions of cold ethanol and dried. Wt. 31.5 g. This product, 1-[2-(N-ethyl-N - 2 - hydroxyethylamino)ethylamino]-4-methyl-7 - chlorothiaxanthone hydrochloride, weighed 24.9 g. and melted at 218–220.8° C. (cor.) when recrystallized from absolute ethanol.

Anal.: Calcd. for $C_{20}H_{23}ClN_2O_2S \cdot HCl$: N, 6.56. Found: N, 6.52.

Other 1 - [2 - (N - ethyl - N - 2 - hydroxyethylamino)ethylamino] - 4 - methyl -7-halothiaxanthones can be prepared according to the procedure given above, but using other 1,7-dihalo-4-methylthiaxanthones in place of 1,7-dichloro-4-methylthiaxanthone. Thus, using 1,7-dibromo-4-methylthiaxanthone or 1-chloro-4-methyl-7-bromothiaxanthone, there is obtained 1-[2-(N-ethyl - N - 2-hydroxyethylamino)ethylamino]-4-methyl-7-bromothiaxanthone in the form of its hydrobromide or hydrochloride addition salt, respectively. Using 1,7-diiodo - 4 - methylthiaxanthone or 1-chloro-4-methyl-7-iodothiaxanthone, there is obtained 1-[2-(N-ethyl-N-2-hydroxyethylamino)ethylamino]-4-methyl - 7 - iodothiaxanthone in the form of its hydroiodide or hydrochloride addition salt, respectively.

EXAMPLE 10

1-[2-(2-hydroxybutylamino)ethylamino]-4-methyl-7-chlorothiaxanthone hydrochloride This preparation was carried out according to the procedure described hereinabove in Example 9C but using 7.3 g. of 1,7-dichloro-4-methylthiaxanthone, 6.0 g. of 2-(2-hydroxybutylamino)-ethylamine and 7.0 g. of pyridine. The product, 1-[2-(2-hydroxybutylamino)ethylamino-4-methyl-7-chlorothiaxanthone hydrochloride, melted at 227.8–230° C. (cor.) when recrystallized from ethanol.

Anal.: Calcd. for $C_{20}H_{23}ClN_2O_2S \cdot HCl$: N, 6.56; S, 7.50. Found: N, 6.27; S, 7.30.

EXAMPLE 11

*1-[2-(2-hydroxy - 2 - methylpropylamino)ethylamino]-4-methyl - 7 - chlorothiaxanthone hydrochloride*

This compound was prepared according to the directions given above in Example 9C but using 8.0 g. of 1,7-dichloro-4-methylthiaxanthone, 7.0 g. of 2-(2-hydroxy-2-methylpropylamino)ethylamine and 7.0 g. of pyridine, with a reflux period of seventeen hours. The product, 1-[2-(2-hydroxy - 2 - methylpropylamine)ethylamino] - 4 - methyl - 7 - chlorothiaxanthone hydrochloride, melted at 231–234° C. (cor.) when recrystallized from ethanol.

Anal.: Calcd. for $C_{20}H_{23}ClN_2O_2S \cdot HCl$: N, 6.56; S, 7.50. Found: N, 6.61; S, 7.50.

EXAMPLE 12

*1-[2-(N-methyl-N-2-hydroxypropylamino)-ethylamino]-4-methyl-7-chlorothiaxanthone hydrochloride*

A mixture of 8.0 g. of 1,7-dichloro-4-methylthiaxanthone, 7.0 g. of 2-(N-methyl - N - 2 - hydroxypropylamino)ethylamine and 8.0 g. of dry pyridine was heated under reflux for eighteen hours. The solution was cooled, treated with 50% aqueous potassium hydroxide solution and steam-distilled. The residue was dissolved in chloroform, and the chloroform solution was dried and concentrated. The residue was dissolved in absolute ethanol, and the solution was filtered and treated with ethanolic hydrogen chloride. Ether was added and the resulting solution was chilled, yielding the product, 1-[2-(N-methyl-N-2-hydroxypropylamino)ethylamino] - 4 - methyl - 7 - chlorothiaxanthone hydrochloride, which melted at 198.5–199.9° C. (cor.) when recrystallized from absolute ethanol.

Anal.: Calcd. for $C_{20}H_{23}ClN_2O_2S \cdot HCl$: N, 6.56; S, 7.51. Found: N, 6.37; S, 7.69.

EXAMPLE 13

A. *2-(N-ethyl-N-2-hydroxypropylamino)ethylamine*

This preparation was carried out according to the directions given hereinabove in Example 5B but using 125 g. of 2-bromoethylphthalimide, 102 g. of N-ethyl-N-2-hydroxypropylamine and 300 ml. of dry xylene, with a reflux period of seven hours. The product, 2-(N-ethyl-N-2-hydroxypropylamino)ethylamine, boiled at 102–203° C. at 8.0 mm.

Anal.: Calcd. for $C_7H_{18}N_2O$: N, 19.15. Found: N, 18.68.

B. *1-[2-(N-ethyl-N-2-hydroxypropylamino)ethylamino]-4-methyl-7-chlorothiaxanthone hydrochloride*

The preparation was carried out following the procedure described hereinabove in Example 12 but using 8.0 g. of 1,7-dichloro-4-methylthiaxanthone, 7.0 g. of 2-(N-ethyl-N-2-hydroxypropylamino)ethylamine and 8.0 g. of pyridine. The product, 1-[2-(N-ethyl - N - 2 - hydroxpropylamino)ethylamino]-4-methyl-7-chlorothiaxanthone hydrochloride, melted at 188.3–190.3° C. (cor.) when recrystalized from absolute ethanol.

Anal.: Calcd. for $C_{21}H_{25}ClN_2O_2S \cdot HCl$: N, 6.35; S, 7.27. Found: N, 6.05; S, 7.35.

EXAMPLE 14

*1 - [2 - (N - n - butyl-N-2-hydroxypropylamino)ethylamino]-4-methyl - 7 - chlorothiaxanthone hydrochloride*

This preparation was carried out according to the procedure described hereinabove in Example 12 but using 7.3 g. of 1,7-dichloro-4-methylthiaxanthone, 7.0 g. of 2-(N-n-butyl-N-2-hydroxypropylamino)ethylamine and 7.0 g. of pyridine. The product, 1 - [2 - (N - n - butyl-N-2-hydroxypropylamino)ethylamino] - 4 - methyl-7-chlorothiaxanthone hydrochloride, melted at 161.6–163.8° C. (cor.) when recrystallized from acetone-methanol.

Anal.: Calcd. for $C_{23}H_{29}ClN_2O_2S \cdot HCl$: N, 5.97; S, 6.83. Found: N, 5.75; S, 6.67.

EXAMPLE 15

A. *N-ethyl-N-2-hydroxy-2-methylpropylamine*

To a solution of ethylamine in methanol (1450 ml. of 25.6%) which was cooled to 5° C., there was added dropwise with stirring 144 g. of isobutylene oxide. The temperature rose to 40° C. during the addition. The mixture was stirred for sixteen hours at room temperature and then distilled. The product, N-ethyl-N-2-hydroxy-2-methylpropylamine, boiled at 76–77° C. at 40 mm. and weighed 177 g. (77%).

Anal.: Calcd. for $C_6H_{15}NO$: N, 11.95. Found: N, 11.58.

B. *2-(N-ethyl-N-2-hydroxy - 2 - methylpropylamino)ethylamine*

This preparation was carried out according to the directions given above in Example 5B but using 170 g. of 2-bromoethylphthalimide, 174 g. of N-ethyl-N-2-hydroxy-2-methylpropylamine and 425 ml. of dry xylene, with a reflux period of seven hours. The product, 2-(N-ethyl-N-2-hydroxy-2-methylpropylamino)ethylamine, boiled at 79–80° C. at 3.0 mm.

Anal.: Calcd. for $C_8H_{20}N_2O$: N, 17.47. Found: N, 17.21.

C. *1-[2(N-ethyl - N - 2-hydroxy-2-methylpropylamino)ethylamino]-4-methyl - 7 - chlorothiaxanthone hydrochloride*

A mixture of 11.0 g. of 1,7-dichloro-4-methylthiaxanthone, 9.0 g. of 2-(N-ethyl-N-2-hydroxy-2-methylpropylamino)ethylamine and 10.0 g. of pyridine was refluxed for eighteen hours. The reaction mixture was dissolved in 75 ml. of absolute ethanol and the resulting solution treated with an excess of ethanolic hydrogen chloride. The dark red solution was kept at 5° C. overnight. The crystals that separated were filtered off and were not investigated further. The filtrate was diluted with ether, whereupon there separated a gum which soon solidified. After three crystallizations from ethanol-ether, there was obtained 4.5 g. of the product, 1-[2-(N-ethyl-N-2-hydroxy-2 - methylpropylamino)ethylamino]-4-methyl-7-chlorothiaxanthone hydrochloride, which melted at 201–202.2° C.

Anal.: Calcd. for $C_{22}H_{27}ClN_2O_2S \cdot HCl$: N, 6.10; S, 7.03. Found: N, 5.86; S, 7.12.

When 1-chloro-4,7-dimethylthiaxanthone or 1-chloro-4-methyl-7-methoxythiaxanthone is used instead of 1,7-dichloro-4-methylthiaxanthone in the foregoing preparation, the resulting product is 1-[2-(N - ethyl-N-2-hydroxy-2-methylpropylamino)ethylamino] - 4,7 - dimethylthiaxanthone hydrochloride or 1-[2-(N-ethyl-N-2-hydroxy-2-methylpropylamino)ethylamino] - 4 - methyl-7- methoxy - thiaxanthone hydrochloride, respectively.

EXAMPLE 16

A. 1-chloro-4,7-dimethylthiaxanthone

A mixture of 10 g. of 2-(2-methyl-5-chlorophenylmercapto)-4-methylbenzoic acid and 100 g. of concentrated sulfuric acid was heated with stirring on a steam bath for ninety minutes. The reaction mixture was cooled, poured into water and the resulting aqueous mixture filtered. The yellow solid was suspended in dilute ammonia and heated to boiling. After ten minutes the solid was collected, washed with water and then acetone, and dried. There was thus obtained 8.5 g. of 1-chloro-4,7-dimethylthiaxanthone, M. P. 147.8–148.8° C. (cor.) when recrystallized from acetic acid-water.

Anal.: Calcd. for $C_{15}H_{11}ClOS$: C, 65.56; H, 4.04. Found: C, 65.47; H, 4.35.

Other 1 - halo-4-methyl-7-alkylthiaxanthones can be obtained according to the foregoing procedure by using other 2-(2-methyl-5-halophenylmercapto)-4-alkylbenzoic acids in place of 2-(2-methyl-5-chlorophenylmercapto)-4-methylbenzoic acid. Thus, using 2-(2-methyl-5-bromophenylmercapto)-4-ethylbenzoic acid, 2-(2-methyl-5-iodophenylmercapto) - 4 - isopropylbenzoic acid, 2-(2-methyl-5-chlorophenylmercapto)-4-n-butylbenzoic acid and 2-(2 - methyl - 5 - chlorophenylmercapto)-4-isobutylbenzoic acid, there is obtained, respectively, 1-bromo-4-methyl-7-ethylthiaxanthone, 1 - iodo - 4 - methyl-7-isopropylthiaxanthone, 1-chloro-4-methyl-7-n-butylthiaxanthone and 1-chloro-4-methyl-7-isobutylthiaxanthone.

B. 1-[2-(N-ethyl-N-2-hydroxyethylamino)ethylamino]-4,7-dimethylthiaxanthone hydrochloride This preparation was carried out according to the directions described above in Example 9C but using 5.0 g. of 1-chloro-4,7-dimethylthiaxanthone, 5.0 g. of 2-(N-ethyl-N-2-hydroxyethylamino)ethylamine and 5.0 g. of pyridine. The product, 1 - [2 - (N-ethyl-N-2-hydroxyethylamino)ethylamino] - 4,7 - dimethylthiaxanthone hydrochloride, melted at 186.1–187.8° C. (cor.) when recrystallized from ethanol.

Anal.: Calcd. for $C_{21}H_{26}N_2O_2S \cdot HCl$: N, 6.89; S, 7.88. Found: N, 6.60; S, 8.00.

Other 1 - [2 - (N-ethyl-N-2-hydroxyethylamino)ethylamino] -4-methyl-7-alkylthiaxanthones can be prepared following the directions given above, but using other 1-halo-4-methyl-7-alkylthiaxanthones in place of 1-chloro-4,7-dimethylthiaxanthone. Thus, using 1-bromo-4-methyl-7-ethylthiaxanthone, 1 - iodo-4-methyl-7-isopropylthiaxanthone, 1- chloro-4-methyl-7-n-butylthiaxanthone and 1-chloro-4-methyl-7-isobutylthiaxanthone, there is obtained 1 - [2-(N-ethyl-N-2-hydroxyethylamino)ethylamino]-4-methyl-7-ethylthiaxanthone hydrobromide, 1-[2-(N-ethyl-N - 2 - hydroxyethylamino)ethylamino]-4-methyl-7-isopropylthiaxanthone hydroiodide, 1-[2-(N - ethyl-N-2-hydroxyethylamino)ethylamino]-4-methyl-7-n-butylthiaxanthone hydrochloride and 1 - [2 - (N-ethyl-N-2-hydroxyethylamino)ethylamino]-4 - methyl - 7 - isobutylthiaxanthone hydrochloride, respectively.

EXAMPLE 17

A. 1-chloro-4-methyl-7-methoxythiaxanthone

The preparation of this compound was carried out following the procedure described hereinabove in Example 16A, but using 16.0 g. of 2-(2-methyl-5-chlorophenylmercapto)-4-methoxybenzoic acid and 160 g. of sulfuric acid, and a heating period of thirty minutes. There was obtained 9.7 g. of 1 - chloro - 4 - methyl-7-methoxythiaxanthone, M. P. 188.0–190.1° C. (cor.) when recrystallized from acetic acid.

Anal.: Calcd. for $C_{15}H_{11}ClO_2S$: S, 11.03. Found: S, 11.08.

Other 1-halo-4-methyl-7-alkoxythiaxanthones can be prepared according to the above procedure, but substituting the appropriate 2-(2-methyl-5-halophenylmercapto)-4-alkoxybenzoic acid for 2-(2-methyl-5-chlorophenylmercapto) - 4 -methoxybenzoic acid. Thus, using 2-(2-methyl-5-bromophenylmercapto)-4-ethoxybenzoic acid, 2-(2-methyl-5-iodophenylmercapto)-4-n-propoxybenzoic acid, 2-(2-methyl-5-chlorophenylmercapto)-4-isobutoxybenzoic acid and 2-(2-methyl-5-chlorophenylmercapto) - 4 -n-butoxybenzoic acid, there is obtained 1-bromo-4-methyl-7-ethoxythiaxanthone, 1-iodo-4-methyl-7-n-propoxythiaxanthone, 1-chloro - 4 - methyl-7-isobutoxythiaxanthone and 1-chloro-4-methyl-7-n-butoxythiaxanthone, respectively.

B. 1-[2-(N-ethyl-N-2-hydroxyethylamino)ethylamino]-4-methyl-7-methoxythiaxanthone hydrochloride This preparation was carried out following the directions given hereinabove in Example 9C but using 5.0 g. of 1-chloro-4-methyl-7-methoxythiaxanthone, 5.0 g. of 2-(N-ethyl-N-2-hydroxyethylamino)ethylamine and 5.0 g. of pyridine. The product, 1-[2-(N-ethyl-N-2-hydroxyethylamino)ethylamino] - 4 - methyl-7-methoxythiaxanthone hydrochloride, melted at 198.4–200.8° C. (cor.).

Anal.: Calcd. for $C_{21}H_{26}N_2O_3S \cdot HCl$: N, 6.16; S, 7.05. Found: N, 6.37; S, 7.00.

Other 1-[2-(N - ethyl - N - 2 - hydroxyethylamino)ethylamino] - 4 - methyl-7 - alkoxythiaxanthones can be prepared according to the procedure given above but using other 1-halo-4-methyl-7-alkoxythiaxanthones in place of 1-chloro - 4 - methyl - 7 - methoxythiaxanthone. Thus, using 1-bromo - 4 - methyl-7-ethoxythiaxanthone, 1-iodo-4-methyl-7- n - propoxythiaxanthone, 1-chloro-4-methyl - 7 - isobutoxythiaxanthone and 1-chloro-4-methyl-7-n-butoxythiaxanthone there is obtained 1-[2-(N-ethyl-N - 2 - hydroxyethylamino)ethylamino] - 4-methyl - 7 - ethoxythiaxanthone hydrobromide, 1-[2-(N-ethyl-N - 2 - hydroxyethylamino)ethylamino]-4 - methyl - 7 - n - propoxythiaxanthone hydroiodide, 1-[2-(N-ethyl-N-2 - hydroxyethylamino)ethylamino]-4-methyl-7 - isobutoxythiaxanthone hydrochloride and 1-[2-(N-ethyl-N-2-hydroxyethylamino)ethylamino]-4 - methyl - 7- n - butoxythiaxanthone hydrochloride, respectively.

EXAMPLE 18

1-[2-(N-ethyl-N-2-hydroxyethylamino)ethylamino]-4-methylthiaxanthone hydrochloride This preparation was carried out following the procedure used hereinabove in Example 5C but using 20 g. of a mixture of 1-chloro-4-methylthiaxanthone and its 1-methyl-4-chloro isomer, 10 g. of 2-(N-ethyl-N-2-hydroxyethylamino)-ethylamine, and 10 g. of pyridine. The product, 1-[2-(N-ethyl-N - 2 - hydroxyethylamino)-ethylamino]-4 - methylthiaxanthone hydrochloride, melted at 187.4–188.8° C. (cor.) when recrystallized from ethanol.

Anal.: Calcd. for $C_{20}H_{24}N_2O_2S \cdot HCl$: N, 7.13; S, 8.16. Found: N, 7.21; S, 8.47.

I claim:

1. A thiaxanthone having the formula

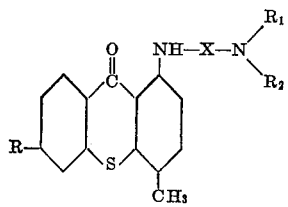

where R is a member of the group consisting of hydrogen, halo groups, lower alkyl radicals and lower alkoxy radicals, X is a lower alkylene radical having its two connecting linkages on adjacent carbon atoms, $R_1$ is a member of the group consisting of hydrogen and lower alkyl radicals and $R_2$ is a lower 2-hydroxyalkyl radical.

2. A compound according to claim 1 where R is halogen and $R_1$ is a lower alkyl radical.

3. A compound according to claim 1 where R and $R_1$ are each lower alkyl radicals.

4. A compound according to claim 1 where R is a lower alkoxy radical and $R_1$ is a lower alkyl radical.

5. A thiaxanthone having the formula

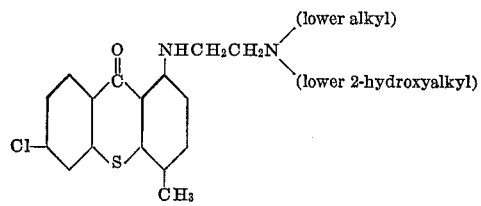

6. A thiaxanthone having the formula

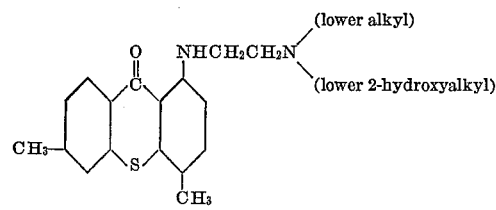

7. A thiaxanthone having the formula

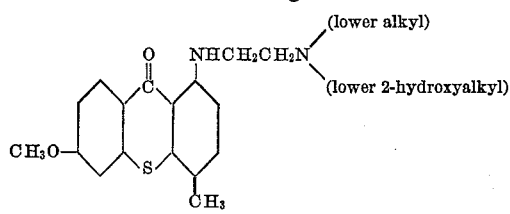

8. 1 - [2 - (N-ethyl-N-2-hydroxyethylamino)-ethylamino]-4-methyl-7-chlorothiaxanthone.

9. 1 - [2-(N-ethyl-N-2-hydroxypropylamino)-ethylamino]-4-methyl-7-chlorothiaxanthone.

10. 1 - [2-(N-ethyl-N-2-hydroxy-2-methylpropylamino)ethylamino] - 4-methyl-7-chlorothiaxanthone.

11. 1 - [2 - (N-ethyl-N-2-hydroxyethylamino) - ethylamino]-4,7-dimethylthiaxanthone.

12. 1 - [2 - (N-ethyl-N-2-hydroxyethylamino) - ethylamino]-4-methyl-7-methoxythiaxanthone.

13. The process of preparing a thiaxanthone having the formula

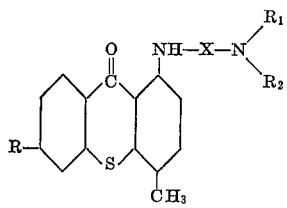

where R is a member of the group consisting of hydrogen, halo groups, lower alkyl radicals and lower alkoxy radicals, X is a lower alkylene radical having its two connecting linkages on adjacent carbon atoms, $R_1$ is a member of the group consisting of hydrogen and lower alkyl radicals and $R_2$ is a lower 2-hydroxyalkyl radical, which comprises heating a 1-halo-4-methyl-7-R-thiaxanthone with a diamine having the formula, $R_1R_2N-X-NH_2$, where $R_1$, $R_2$ and X have the meanings designated hereinabove.

14. A process according to claim 13 where R is halogen and $R_1$ is a lower alkyl radical.

15. A process according to claim 13 where R and $R_1$ are each lower alkyl radicals.

16. A process according to claim 13 where R is a lower alkoxy radical and $R_1$ is a lower alkyl radical.

17. The process of preparing 1-[2-(N-ethyl-N-2 - hydroxyethylamino)ethylamino]-4-methyl-7-chlorothiaxanthone which comprises heating 1,7-dichloro-4-methylthiaxanthone with 2-(N-ethyl-N-2-hydroxyethylamino) ethylamine.

18. The process of preparing 1-[2-(N-ethyl-N-2 - hydroxypropylamino)ethylamino]-4-methyl-7-chlorothiaxanthone which comprises heating 1,7-dichloro-4-methylthiaxanthone with 2-(N-ethyl-N-2-hydroxypropylamino)ethylamine.

19. The process of preparing 1-[2-(N-ethyl-N-2 - hydroxy-2-methylpropylamino)ethylamino]-4-methyl-7-chlorothiaxanthone which comprises heating 1,7-dichloro-4-methylthiaxanthone with 2 - (N-ethyl - N - 2 - hydroxy - 2 - methylpropylamino)ethylamine.

20. The process of preparing 1-[2-(N-ethyl-N-2 - hydroxyethylamino)ethylamino]-4,7-dimethylthiaxanthone which comprises heating 1-chloro-4,7-dimethylthiaxanthone with 2-(N-ethyl-N-2-hydroxyethylamino) ethylamine.

21. The process of preparing 1-[2-(N-ethyl-N-2 - hydroxyethylamino)ethylamino]-4-methyl-7-methoxythiaxanthone which comprises heating 1 - chloro-4-methyl-7-methoxythiaxanthone with 2-(N-ethyl-N-2-hydroxyethylamino)ethylamine.

SYDNEY ARCHER.

References Cited in the file of this patent

Fiat Review of German Science, Chemotherapy, Office of Military Government for Germany, 1948, pp. 283–288.